Figure 1:
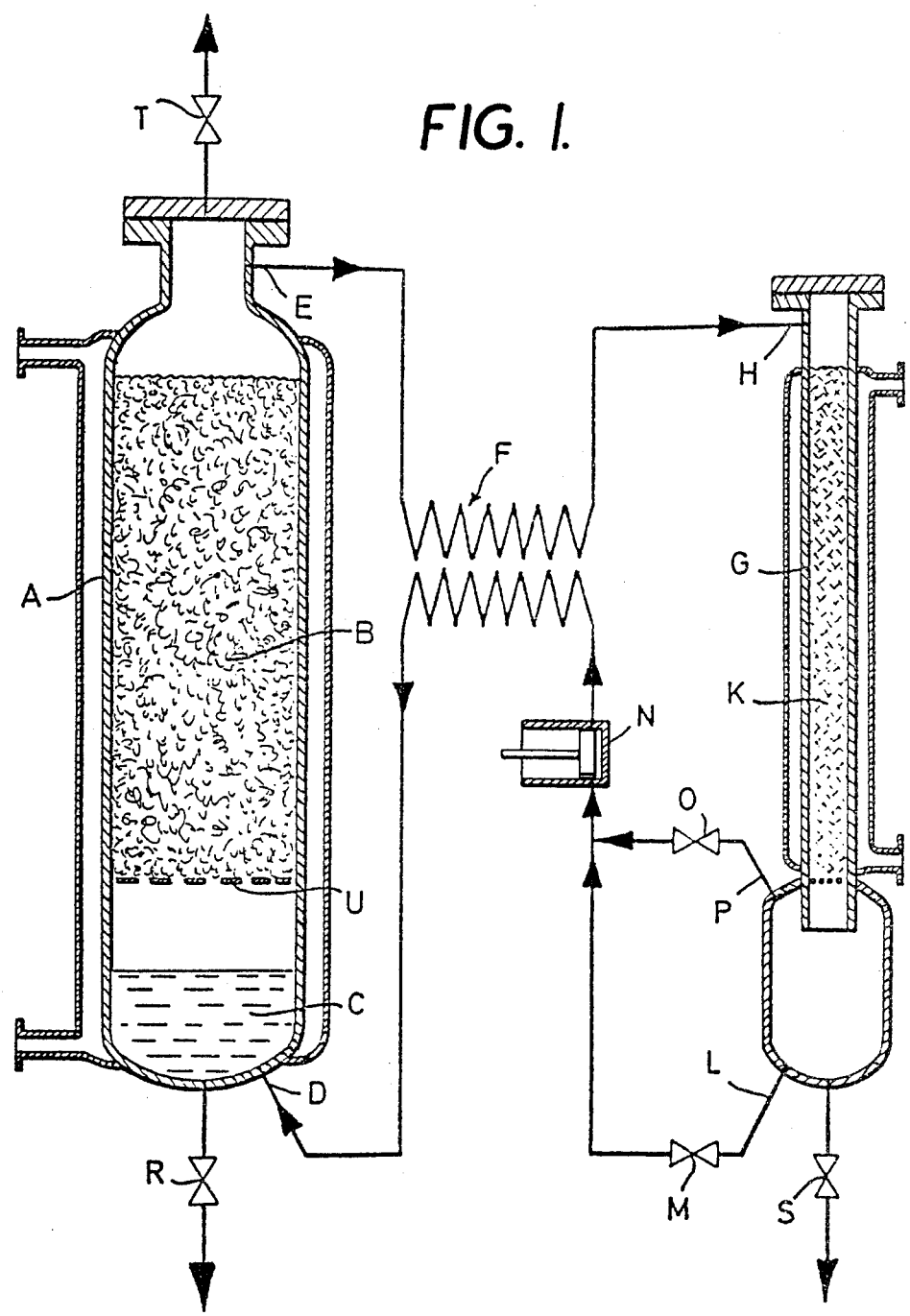

United States Patent [19]

Zosel

[11] 4,260,639
[45] Apr. 7, 1981

[54] PROCESS FOR THE DECAFFEINATION OF COFFEE

[75] Inventor: Kurt Zosel, Oberhausen, Fed. Rep. of Germany

[73] Assignee: Studiengesellschaft Kohle MBH, Mulheim, Fed. Rep. of Germany

[21] Appl. No.: 364,190

[22] Filed: May 25, 1973

Related U.S. Application Data

[63] Continuation-in-part of Ser. No. 110,428, Jan. 28, 1971, abandoned.

[30] Foreign Application Priority Data

Feb. 5, 1970 [DE] Fed. Rep. of Germany ..... 20052931
Feb. 12, 1970 [AT] Austria ............................... 61298/70

[51] Int. Cl.$^2$ .............................................. A23P 1/00
[52] U.S. Cl. ..................................... 426/478; 426/427
[58] Field of Search ...................... 426/481, 427, 428; 260/256

[56] References Cited

U.S. PATENT DOCUMENTS

| | | | |
|---|---|---|---|
| 1,640,648 | 8/1927 | Cross | 426/377 X |
| 3,418,134 | 12/1968 | Rooker | 426/386 |
| 3,806,619 | 4/1974 | Zosel | 426/427 |
| 3,843,824 | 10/1974 | Roselius et al. | 426/386 |

FOREIGN PATENT DOCUMENTS

| | | | |
|---|---|---|---|
| 553800 | 6/1932 | Fed. Rep. of Germany | 426/427 |
| 37854 | 4/1931 | France | 426/427 |
| 779451 | 4/1935 | France | 426/427 |
| 287352 | 7/1931 | Italy | 426/427 |
| 1057911 | 2/1967 | United Kingdom | 426/427 |
| 1290117 | 9/1972 | United Kingdom | 426/427 |

Primary Examiner—Frank Sever
Attorney, Agent, or Firm—Sprung, Felfe, Horn, Lynch & Kramer

[57] ABSTRACT

A process for the decaffeination of coffee which comprises contacting the coffee with moist carbon dioxide in the supercritical state to effect removal of caffeine therefrom and recovering a substantially decaffeinated coffee. Preferred conditions for contact of the moist carbon dioxide are a temperature within the range of 40°–80° C., a pressure within the range of 120–180 atmospheres and a contact time of from 5 to 30 hours.

14 Claims, 2 Drawing Figures

U.S. Patent   Apr. 7, 1981   Sheet 1 of 2   4,260,639

PROCESS FOR THE DECAFFEINATION OF COFFEE

This application is a continuation-in-part of application Ser. No. 110,428, filed Jan. 28, 1971, now abandoned.

This invention relates to a process for the decaffeination of coffee.

Pure coffee is not well tolerated by everybody all the time because of its content of caffeine.

As a result there have been developed already, over a long period, processes for extracting caffeine almost completely from coffee. The caffeine must be extracted from the raw bean, since extraction of the roasted bean cannot be carried out without loss of aroma. When applied to the roasted bean the caffeine and the aromatic substances are extracted. Where the extraction of aromatics can be tolerated, is compensated for, or is desired, the caffeine can be extracted from the roasted bean. Thus, in situations where the coffee produced is reconstituted with aromatics by addition thereof after treatment, as for example in the manufacture of instant coffee, caffeine may be extracted from the roasted bean.

The most unusual decaffeination process is effected in three phases.

DIGESTION

The coffee beans are digested with superheated steam at an elevated temperature until their water content amounts to about 15 to 30% and as a result, the beans swell considerably.

EXTRACTION

The digested beans are treated with an organic solvent under constant mechanical agitation. As solvents, the following are, inter alia, recommended: benzene, ethyl acetate, isopropanol, chloroform, dichloro-ethylene and trichloroethylene.

STEAMING

After the caffeine has been largely extracted, the beans contain a considerable amount of the corresponding solvents, which must be completely removed. The procedure for solvent removal is tedious and comprises repeatedly steaming under pressure followed by releasing the pressure until there are only traces of solvent left in the beans. Thereafter, the moist beans are then dried, either under vacuum or at elevated temperature with warm air.

It has now been found that the caffeine can be quantitatively removed from the raw coffee by treating the coffee with moist carbon dioxide in the supercritical state. The invention therefore provides a process for the decaffeination of coffee in which caffeine is removed from raw coffee by contacting said raw coffee with moist carbon dioxide in the supercritical state. It is to be understood by the expression "supercritical state" according to the invention that the carbon dioxide has a temperature above the critical temperature and simultaneously a pressure above the critical pressure of the carbon dioxide as described in the Austrian Pat. No. 255,371. The observation that caffeine could be removed relatively easily from moist raw coffee by subjecting it to a supercritical gas phase was not expected for the following reason.

The German Democratic Republic Pat. No. 41,362 and also the corresponding British Pat. No. 1,057,911 are concerned with processes for separating mixtures for substances by means of gases in the supercritical state. It is shown in Examples 61 and 62 thereof that substances which are dissolved in water or are present in an aqueous emulsion can only be taken up, with very great difficulty, in a gas in the supercritical state.

However, caffeine, dissolved in water, can be taken up relatively easily in gaseous carbon dioxide in the supercritical state, whereas dry caffeine is not.

In the above mentioned two patents is described that the supercritical gas used in chemically inert towards the substances to be taken up or separated. Nonpolar gases in supercritical status do not take up water. Carbon dioxide is a nonpolar gas; yet it takes up water in its supercritical status. The reason for this unexpected behavior is probably that carbon dioxide forms $H_2CO_3$ in the presence of water which is taken up by excess of supercritical carbon dioxide. Therefore, moist carbon dioxide in the supercritical status has not the properties of a nonpolar gas anymore but rather those of a polar gas. Therefore, caffeine or its salts are not affected by pure carbon dioxide in supercritical status, only by moist carbon dioxide.

Figure 2:
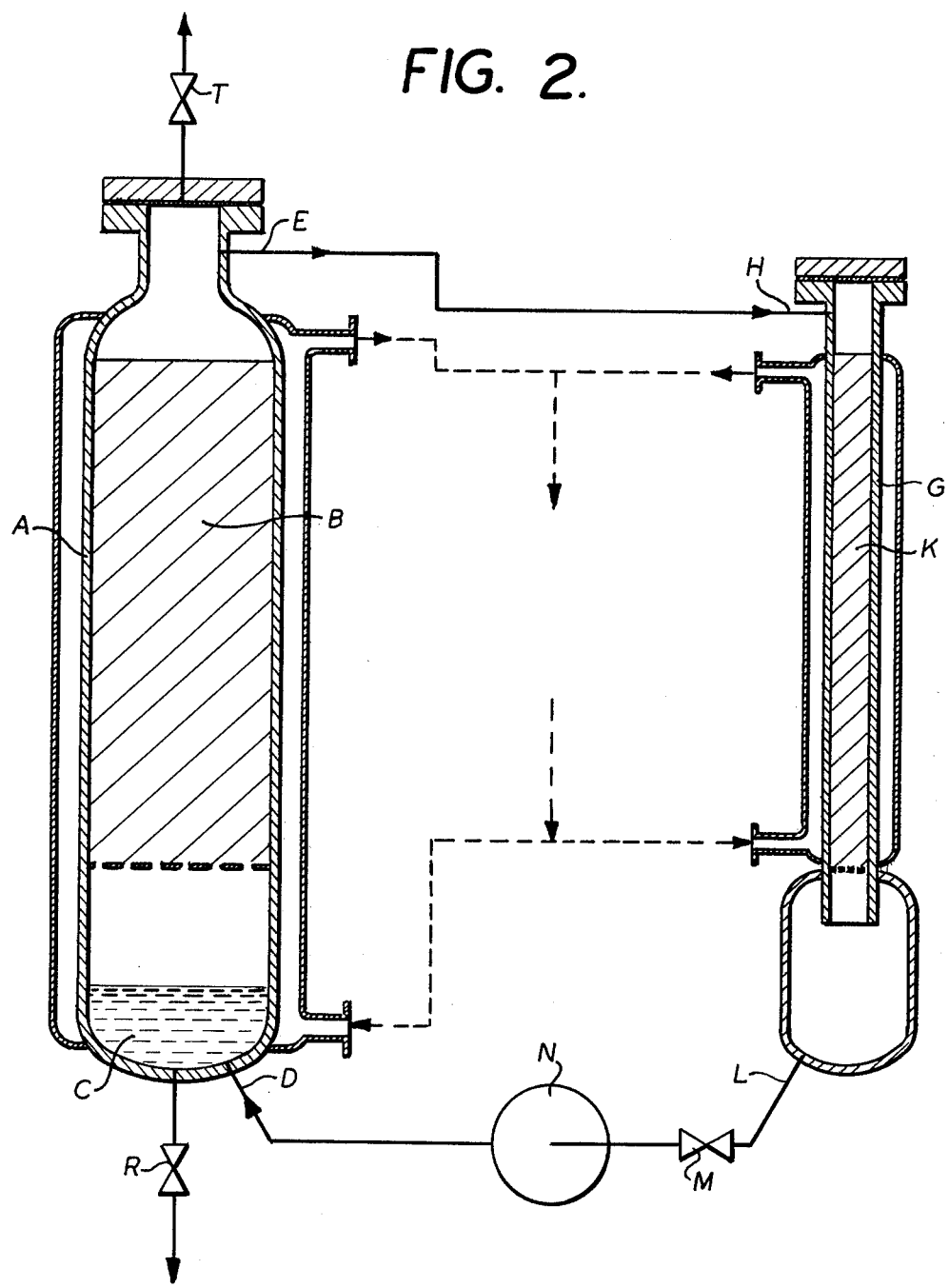

The decaffeination process of the invention will be explained by reference to an example and by reference to the accompanying drawings, wherein:

FIG. 1 is a flow diagram for one embodiment of the invention, wherein loaded carbon dioxide is cooled for condensation and is contacted with active carbon for removal of the caffeine; and FIG. 2 is a flow diagram for an embodiment of the invention wherein the loaded carbon dioxide is contacted with active carbon to remove the caffeine.

In the drawings, like reference characters refer to corresponding parts.

Referring to FIG. 1, raw coffee B is disposed on a screening plate U in a pressurized vessel A containing water C in the bottom of said vessel. The pressurized vessel is heated by a water jacket to about 70° C. Carbon dioxide enters the pressurized vessel at D and is conducted through the vessel at a temperature of about 70° C. and a pressure of about 160 atm. The carbon dioxide first of all bubbles through the water, whereby it is moistened with water and then flows through the coffee, where it gives off some of its water to the coffee beans and at the same time is charged with caffeine. The carbon dioxide, now charged both with water and caffeine, leaves the pressurized vessel A at E and is conveyed through heat exchanger F into pressurized vessel G, entering at H. The narrow upper portion of this pressurized vessel G is charged with active carbon K and is heated by a water jacket to about 25° C. In the heat exchanger F, the charged supercritical carbon dioxide stream is cooled from about 70° to about 25° C., and as a result, liquification of the carbon dioxide occurs.

Carbon dioxide in the supercritical state charged with water at 70° C. takes up an amount several times greater than the amount expected when calculated on the basis of its vapor pressure at 70° C. When carbon dioxide is liquified in the heat exchanger, liquid water is simultaneously separated out, since water is only slightly soluble in liquid carbon dioxide at 25° C.

The stream containing a small amount of liquified water and a larger amount of liquified carbon dioxide and caffeine dissolved therein therefore enters the pressure separator G. Carbon dioxide and water pass through the active carbon, whereas the caffeine is quantitatively retained on the carbon. The liquid carbon dioxide and water leave the pressurized vessel G again at L and are returned by way of the valve M, the circulating pump N and the heat exchanger F into the pressurized vessel A. The valve O is closed during the treatment of the caffeine.

After terminating the caffeine treatment, the valve M is closed while the valve O is opened. Then only liquid carbon dioxide discharges at P from the pressurized vessel G. At the same time, the water C which is still in the pressurized vessel A is drawn off through the valve R. Dry, supercritical carbon dioxide now enters the pressurized vessel A at D, and it becomes charged with the water which the raw coffee had taken up during the caffeine treatment. This water is collected at the bottom of the pressurized vessel G and can be drawn off through the valve S.

After completion of the drying operation, the carbon dioxide is drawn off through the valve T and the raw coffee, now free from caffeine and ready for roasting, is emptied pheumatically through the flange.

The embodiment stream in FIG. 2 differs from the embodiment shown in FIG. 1 in that in FIG. 2 the loaded gas is contacted with active carbon in pressure vessel G for adsorption of the caffeine. The lean gas issuing from the adsorber G is circulated by circulating pump N. In this embodiment the moist carbon dioxide can be circulated without change in pressure or temperature.

The process is preferably carried out at a temperature of about 40°–80° C. and a pressure of 120–180 atm.

The decaffeination takes from 5 up to about 30 hours and the subsequent drying from ½ up to 5 hours. The entire process takes place more quickly at the higher temperature and the higher pressure.

It is not necessary to remove the caffeine by adsorption on active carbon from the circulating stream of carbon dioxide. It can also be separated out of expansion of the circulating carbon dioxide, this being a fundamental method of separation which is also claimed in the patents referred to above. In such a case, however, it is necessary for the carbon dioxide to be recompressed by a compressor. In the embodiment as described above, on the other hand, it is only necessary to keep liquid carbon dioxide and some water (FIG. 1) or moist gaseous carbon dioxide (FIG. 2) in circulation by means of a piston pump or gearwheel pump.

With the process of the invention, almost only caffeine is exclusively removed from the bean. The residual content of caffeine in the raw coffee can in this way be reduced to below 0.01%.

The new process makes it possible for raw coffee to be converted in one step into caffeine-free coffee ready for roasting.

As indicated above, however, where removal of aromatics can be tolerated, is compensated for, or is desirable, the process can be applied to roasted coffee.

What is claimed is:

1. A process for the decaffeination of raw coffee which comprises contacting the raw coffee with water-moist carbon dioxide above its critical temperature and critical pressure to effect removal of caffeine therefrom and recovering a substantially decaffeinated coffee, the amount of water in the carbon dioxide being sufficient to effectuate said removal of the caffeine from the coffee.

2. A process as claimed in claim 1, in which contact with the moist carbon dioxide is effected at a temperature of from 40° L to 80° C. and under a pressure of 120 to 180 atmospheres.

3. A process as claimed in claim 2, in which the contact with the moist carbon dioxide is effected for a period of from 5 to 30 hours.

4. A process as claimed in claim 1, in which the contact with the moist carbon dioxide is effected for a period of from 5 to 30 hours.

5. A process as claimed in claim 1, in which during said contacting, the carbon dioxide takes up caffeine, and contacting the carbon dioxide containing caffeine with active carbon for take up of caffeine by the active carbon.

6. A process as claimed in claim 5, and recovering carbon dioxide from said contacting with active carbon, and recycling the recovered carbon dioxide to the contacting of raw coffee with carbon dioxide.

7. A process according to claim 6, in which contact with the moist carbon dioxide is effected at a temperature of from 40° to 80° C. and under a pressure of 120 to 180 atmospheres.

8. A process according to claim 5, in which the carbon dioxide containing caffeine from the contacting of carbon dioxide and raw coffee is cooled to condense carbon dioxide forming liquid carbon dioxide with caffeine dissolved therein, and the condensate is contacted with said active carbon for the take up of caffeine by the active carbon.

9. A process according to claim 8, and recovering liquid carbon dioxide from said contacting with active carbon, pumping the recovered liquid carbon dioxide to a heat exchanger, heating the pumped liquid to the supercritical temperature, moistening the carbon dioxide, and recycling the heated and moistened carbon dioxide to the contacting of raw coffee with carbon dioxide.

10. A process according to claim 9, in which contact with the moist carbon dioxide is effected at a temperature of from 40° to 80° C. and under a pressure of 120 to 180 atmospheres.

11. A process according to claim 8, in which contact with the moist carbon dioxide is effected at a temperature of from 40° to 80° C. and under a pressure of 120 to 180 atmospheres.

12. A process according to claim 5, in which contact with the moist carbon dioxide is effected at a temperature of from 40° to 80° C. and under a pressure of 120 to 180 atmospheres.

13. Process according to claim 5, wherein the moist carbon dioxide in supercritical state containing caffeine is contacted with the active carbon and following said contacting the moist carbon dioxide in supercritical state is recycled to the contacting of coffee with carbon dioxide.

14. Process according to claim 1, wherein the temperature of the carbon dioxide is 40° to 80° C.

* * * * *